(12) United States Patent
Lasch et al.

(10) Patent No.: US 6,218,592 B1
(45) Date of Patent: Apr. 17, 2001

(54) METHOD AND APPARATUS FOR THE TREATMENT OF RADIOACTIVE EVAPORATOR CONCENTRATES FROM NUCLEAR PLANTS

(75) Inventors: Manfred Lasch, Rettenbach; Udo Krumpholz, Gundremmingen, both of (DE)

(73) Assignee: Kernkraftwerke Gundremmingen Betriebsgesellschaft mbH, Gundremmingen (DE)

( * ) Notice: Subject to any disclaimer, the term of this patent is extended or adjusted under 35 U.S.C. 154(b) by 0 days.

(21) Appl. No.: 09/528,490

(22) Filed: Mar. 17, 2000

(30) Foreign Application Priority Data

Mar. 23, 1999 (DE) .............................................. 199 13 103

(51) Int. Cl.$^7$ ....................................................... G21F 9/08
(52) U.S. Cl. ............................. 588/20; 159/45; 159/47.3; 159/DIG. 12; 210/710; 210/737; 210/774; 210/805; 976/DIG. 381
(58) Field of Search ...................... 159/45, 47.3, DIG. 5, 159/DIG. 12; 588/20; 210/702, 710, 737, 774, 805; 976/DIG. 381

(56) References Cited

U.S. PATENT DOCUMENTS 3,988,414 * 10/1976 Klicka et al. ........................... 159/48
4,314,877 * 2/1982 Queiser et al. ......................... 159/49

* cited by examiner

Primary Examiner—Robert Popovics
(74) Attorney, Agent, or Firm—Heller Ehrman White & McAuliffe LLP

(57) ABSTRACT

A method for the treatment of radioactive evaporator concentrates from the evaporation system of nuclear plants comprises the steps of (a) freeing the evaporator concentrates from undissolved components,
(b) crystallizing the sodium sulfate contained in the evaporator concentrates as Glauber's salt ($Na_2SO_4 \cdot 10 H_2O$) on an immersion cooler,
(c) recrystallizing the Glauber's salt deposited on the immersion cooler,
(d) optionally, repeating the recrystallization step (c) once or several times,
(e) separating essentially inactive sodium sulfate from the process, and
(f) recycling the depleted evaporator concentrates of step (a) to the evaporation system.

13 Claims, 1 Drawing Sheet

METHOD AND APPARATUS FOR THE TREATMENT OF RADIOACTIVE EVAPORATOR CONCENTRATES FROM NUCLEAR PLANTS

BACKGROUND OF THE INVENTION

1. Field of the Invention

The invention relates to a method and an apparatus for the treatment of radioactive evaporator concentrates from the evaporation system of nuclear plants, which allow efficient separation, as a non-radioactive product, of the sodium sulfate contained therein and, thus, a cost-effective reduction in volume of the concentrates to be decontaminated and disposed.

2. Description of the Related Art

In nuclear power plants comprising a boiling water reactor, the main condensate is freed from solid ionic and radiochemical contaminations by means of ion exchange resins. During regeneration of said ion exchange resins with caustic and sulfuric acid, solutions are produced which, after having been neutralized, are conveyed into an evaporating plant, where they are concentrated together with other radioactively loaded effluents to a solids content of about 20%. Thus, depending on the size of the plant, about 20 to 100 m$^3$ of evaporator concentrates per year are obtained as liquid radioactive waste.

The evaporator concentrates contain about 1 to 30% by volume of separable solids (ion exchange resin residues, flocculated detergent residues, heavy metal oxides, fibers etc.). Dissolved components are mainly sodium sulfate, the proportion of which may be about 10 to 25% by weight, and other components, such as incrustation inhibitors (e.g. EDTA), surfactants, organic and inorganic salts of decontaminating agents (e.g. citrates, oxalates, phosphates), activation products and others.

In the past, these evaporator concentrates had been further evaporated in a subsequent process step for conditioning and solidified to form a monolithic sodium sulfate block which then proceeded to ultimate waste disposal or interim storage.

This, however, has the disadvantage that vast volumes of waste are produced and no decontamination effect is achieved, since radioactive components are encapsulated in the crystals when the sodium sulfate crystallizes. Although 80% or more of the mass to be ultimately disposed of consists of non-radioactive sodium sulfate, according to current practice the latter has to be disposed of in a rather expensive way together with the radioactive components.

The suggestions made so far for improving the treatment of evaporator concentrates and similar effluents from nuclear plants were directed to binding the effluent's radioactivity by suitable precipitation or flocculation reactions in such a way that the radioactive products can be removed. The remaining decontaminated solution should then be disposed of as weakly radioactive effluent. The disadvantages thereof were the bad precipitation efficiency, so that said process could not be used in modern nuclear plants due to the associated increase in radioactive release.

BRIEF SUMMARY OF THE INVENTION

An object of the invention, thus, is to provide a method and an apparatus for the treatment of radioactive evaporator concentrates from nuclear plants, which allow efficient separation of radioactive and non-radioactive components and, thus, a cost-effective reduction in the volume of waste to be disposed.

These and other objects are achieved in accordance with the invention by a method for the treatment of radioactive evaporator concentrates from the evaporation system of nuclear plants, wherein (a) the evaporator concentrate is freed from undissolved components, (b) the sodium sulfate contained in the evaporator concentrate is crystallized as Glauber's salt ($Na_2SO_4.10H_2O$) on an immersion cooler, (c) the Glauber's salt deposited on the immersion cooler is recrystallized, (d) optionally, the recrystallization step (c) is repeated once or several times, (e) essentially inactive sodium sulfate is separated from the process, and (f) the depleted evaporator concentrate of step (a) is recycled to the evaporation system.

The present invention also provides an apparatus for carrying out said method, said apparatus comprising a container for the evaporator concentrate, an immersion cooler having inlet(s) and outlet(s) for a cooling or heating medium, and a cooling or heating aggregate for providing said cooling or heating medium.

DETAILED DESCRIPTION OF THE INVENTION

Figure 1:
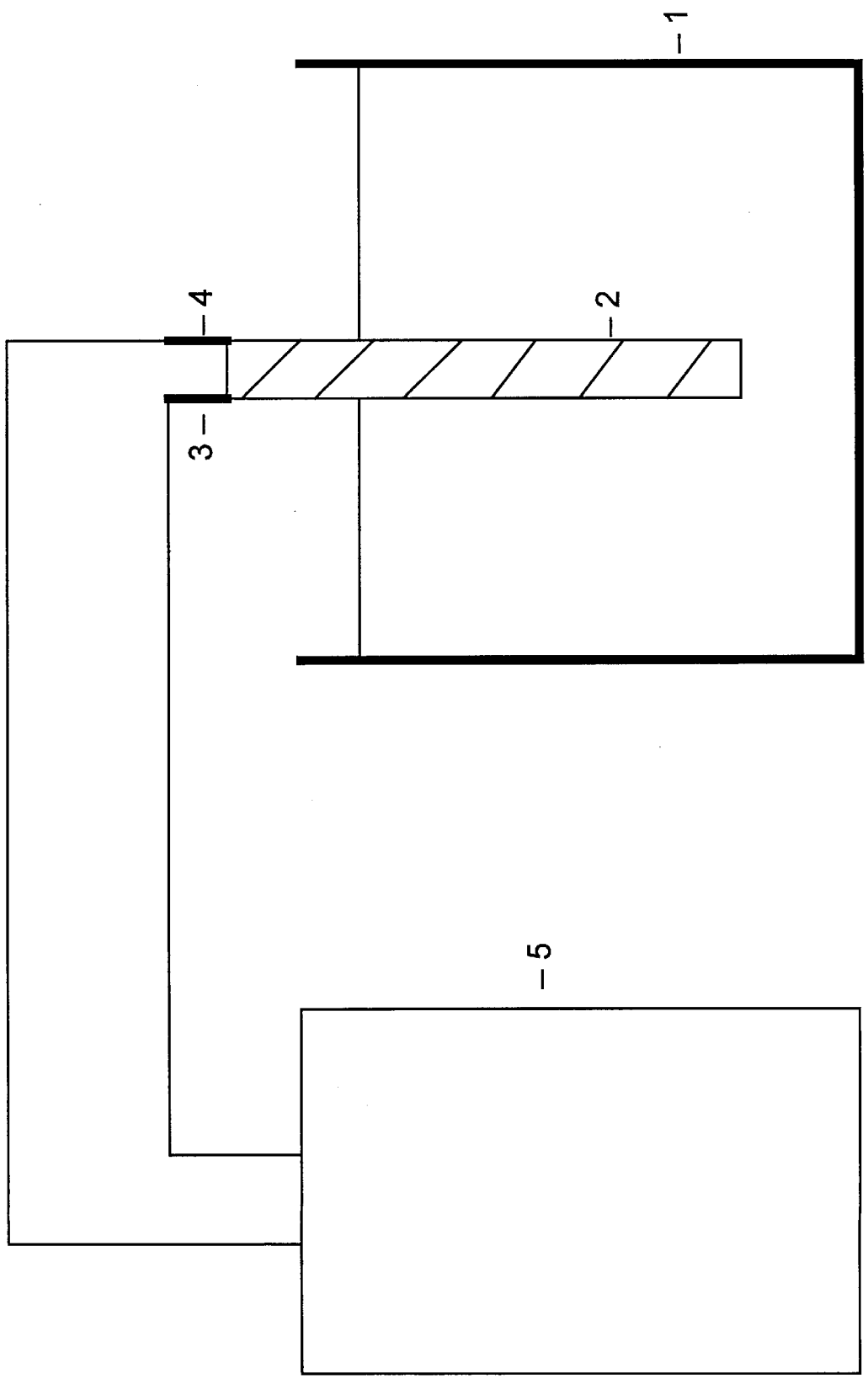
FIG. 1 is a schematic diagram of the apparatus of this invention.

The evaporator concentrate used in the method of the invention should be essentially free of undissolved substances, since the latter impair or prevent a homogeneous crystallization of the sodium sulfate without inclusions of radioactive components. The separation of the unsoluble substances can, e.g., be effected by filtration, decantation, separating or other mechanical separation processes, decantation being preferred.

The evaporator concentrate which is essentially free of suspended matter is introduced at normal temperature into the container of a crystallization apparatus which is schematically shown in FIG. 1. The apparatus consists of a container 1 for receiving the evaporator concentrate, an immersion cooler 2 which has one or more inlets 3 and outlets 4 for a cooling or heating medium and is connected to a cooling or heating aggregate 5 which provides the cooling or heating medium.

The immersion cooler 2 is immersed into the evaporator concentrate which has been introduced into container 1 from the top by means of a lifting apparatus (not shown) after the cooler has been cooled down to about 0° C. by introducing a cooling medium, e.g. ethylene glycol/water or saline, from the cooling or heating aggregate 5. Temperatures below –2° C., i.e. the freezing point of the mother liquor, are undesirable, since in this case ice crystals will deposit on the heat exchange surface of the immersion cooler 2. The evaporator concentrate in container 1 is not agitated or stirred during crystallization.

Under the above-mentioned conditions, the sodium sulfate will crystallize as Glauber's salt ($Na_2SO_4.10H_2O$) from the oversaturated solution and will form uniform crystal layers on the cooling surface which, depending on the crystal habit, may still contain up to about 10% of mother liquor. The formation of excessively thick crystal layers should be prevented. Usually the crystallization is stopped after a period of about 8 hours or after a maximum thickness of the crystal layer of about 5 cm has been reached.

The immersion cooler 2 having the crystal layer deposited thereon is then lifted out of the evaporator concentrate and left further for about 30 minutes above container 1 in order to let the adhering radioactive mother liquor drop off. Usually decontamination factors of about 10–20 are obtained on crystallization; i.e. the specific activity of the crystals is 10–20 times lower than that of the mother liquor. Depending on the starting activity, this is not sufficient to obtain inactive sodium sulfate, so that a subsequent recrystallization is required.

Said recrystallization can be carried out in the form of a cooling crystallization or as a conventional evaporation crystallization. Preferably, a cooling crystallization is employed. For this purpose, the immersion cooler 2 having the Glauber's salt crystals deposited thereon is placed over a bath of deionized (e.g. destilled) water and heated by introducing a heating medium (e.g. warm water) to about 33–40° C. (e.g. 35° C.). This makes the Glauber's salt crystals melt in their own crystal water, slide into the water bath and dissolve therein. The amount of water is preferably selected in such a way that the sodium sulfate concentration is close to the saturation range, i.e. at about 20 to 30% by weight.

Subsequently, the cooling crystallization step is repeated in the manner described above, i.e. the immersion cooler 2 is brought to about 0° C. by introducing a cooling medium and immersed into the sodium sulfate solution obtained. In this case, too, a solid crystal layer of now purified Glauber's salt is obtained after about 8 hours. The remaining sodium sulfate solution can be reused several times and is exchanged as required.

The recovery of the purified Glauber's salt can be effected by heating the immersion cooler 2 again to >33° C., the salt melting in its own crystal water and falling into a collecting tank.

Alternatively, the recrystallization of the Glauber's salt can be effected by conventional methods, whereby, as a rule, crystalline forms of sodium sulfate which contain less crystal water are produced.

The described recrystallization by cooling or evaporation crystallization can be repeated once or several times. In practice, it has become evident that normally two recrystallizations are enough to achieve a sufficient decontamination factor of 1000 to 4000. Generally, the recrystallization is repeated until the desired residual activity is reached.

The thus obtained white inactive sodium sulfate can be processed in the conventional way and does not have to be disposed of in an expensive manner as radioactive industrial waste.

The depleted evaporator concentrate of step a) still contains about 4–6% by weight of sodium sulfate, i.e. 60–75% of the sodium sulfate have been separated off as inactive matter.

The depleted evaporator concentrate is introduced into the evaporation system of the nuclear plant and can be concentrated therein to about 20–25% by volume, i.e., according to the invention the amount of liquid, radioactive industrial waste is reduced by more than 70%. This reduction in volume achieved by the method according to the invention represents an enormous economical advantage. The concentrated evaporator concentrate can either be recycled to separate sodium sulfate as Glauber's salt or it can be finally deposited after having been evaporated and, optionally, stored for decaying.

The crystallization apparatus suited to carry out the method according to the invention comprises a container 1, e.g. made of metal or plastics, having a load capacity of e.g. 500 liters. By means of a lifting apparatus, e.g. a pulley block, an immersion cooler 2 consisting of one or more heat exchange elements can be lowered or immersed into container 1. The heat exchange elements are, e.g., plate- or rod-shaped and preferably have a smooth surface. They can, e.g., consist of stainless steel or another corrosion-resistant material. In a preferred embodiment, the immersion cooler 2 is a plate cooler comprising e.g. 5–10 heat exchange plates. The immersion cooler 2 is preferably designed in such a way that one square meter of heat exchange surface is provided for about 70 liters of evaporator concentrate.

What is claimed is:

1. A method for the treatment of a radioactive evaporator concentrate containing sodium sulfate from an evaporation system of a nuclear plant, comprising:

(a) separating any undissolved components from the evaporator concentrate, (b) crystallizing the sodium sulfate contained in the evaporator concentrate as Glauber's salt ($Na_2SO_4.10H_2O$) by deposition on an immersion cooler, (c) dissolving and recrystallizing the Glauber's salt deposited on the immersion cooler, (d) optionally, at least once further dissolving and recrystallizing the Glauber's salt from step (c), (e) recovering essentially radioinactive Glauber's salt from recrystallization step (c) or (d), and (f) recycling the evaporator concentrate, depleted in sodium sulfate, to the evaporation system.

2. The method of claim 1 where the separation step (a) comprises filtration or decantation.

3. The method of claim 1 where the crystallization step (b) is carried out at a temperature above −2° C.

4. The method of claim 3 where the crystallization step (b) is carried out at a temperature of about 0° C.

5. The method of claim 1 where the dissolution and recrystallization step (c) comprises recrystallization by cooling or recrystallization by evaporation.

6. The method of claim 5 where the dissolution and recrystallization step (c) comprises dissolution and recrystallization by cooling using the immersion cooler of step (b) into which a heating medium and a cooling medium are introduced alternately.

7. The method of claim 6 including further dissolution and recrystallization step (d) where the dissolution and recrystallization step (d) comprises dissolution and recrystallization by cooling using the immersion cooler of step (c) into which a heating medium and a cooling medium are introduced alternately.

8. The method of claim 1 including further dissolution and recrystallization step (d).

9. The method of claim 8 where the dissolution and recrystallization step (d) comprises dissolution and recrystallization by cooling using the immersion cooler of step (b) into which a heating medium and a cooling medium are introduced alternately.

10. The method of claim 1 where the immersion cooler comprises plate-shaped or rod-shaped heat exchange elements.

11. The method of claim 10 where the heat exchange elements have a smooth surface.

12. The method of claim 10 where the immersion cooler comprises plate-shaped heat exchange elements.

13. The method of claim 12 where the immersion cooler has five to ten plate-shaped heat exchange elements.

* * * * *

UNITED STATES PATENT AND TRADEMARK OFFICE
CERTIFICATE OF CORRECTION

| | | |
|---|---|---|
| PATENT NO. | : 6,218,592 B1 | Page 1 of 1 |
| DATED | : April 17, 2001 | |
| INVENTOR(S) | : Lasch et al. | |

It is certified that error appears in the above-identified patent and that said Letters Patent is hereby corrected as shown below:

<u>Title page,</u>
Item [75], Inventors, "Manfred Lasch" should read -- Manfried Lasch --

Signed and Sealed this

Seventh Day of May, 2002

Attest:

Attesting Officer

JAMES E. ROGAN
*Director of the United States Patent and Trademark Office*